(12) United States Patent
Endo

(10) Patent No.: US 12,126,842 B2
(45) Date of Patent: Oct. 22, 2024

(54) SEMICONDUCTOR APPARATUS FOR IMAGE TRANSMISSION

(71) Applicant: ROHM CO., LTD., Kyoto (JP)

(72) Inventor: Hiroharu Endo, Kyoto (JP)

(73) Assignee: ROHM CO., LTD, Kyoto (JP)

( * ) Notice: Subject to any disclaimer, the term of this patent is extended or adjusted under 35 U.S.C. 154(b) by 0 days.

(21) Appl. No.: 18/299,448

(22) Filed: Apr. 12, 2023

(65) Prior Publication Data

US 2023/0254517 A1 Aug. 10, 2023

Related U.S. Application Data

(60) Continuation of application No. 17/196,521, filed on Mar. 9, 2021, which is a division of application No.
(Continued)

(30) Foreign Application Priority Data

Jun. 27, 2016 (JP) .................................. 2016-126996
Feb. 27, 2017 (JP) .................................. 2017-035487

(51) Int. Cl.
*H04N 19/93* (2014.01)
*G09G 3/20* (2006.01)
(Continued)

(52) U.S. Cl.
CPC ............... *H04N 19/93* (2014.11); *G09G 3/20* (2013.01); *G09G 3/2096* (2013.01); *G09G 5/00* (2013.01);
(Continued)

(58) Field of Classification Search
CPC .......... H04N 19/93; H04N 19/44; G09G 5/12; G09G 5/001; G09G 5/18; G09G 2340/02;
(Continued)

(56) References Cited

U.S. PATENT DOCUMENTS 7,079,193 B2 7/2006 Choi
2005/0174314 A1 8/2005 Furihata et al.
(Continued)

FOREIGN PATENT DOCUMENTS

CN 1652170 A 8/2005
CN 101331536 A 12/2008
(Continued)

OTHER PUBLICATIONS

The English version of document WO2015/097855. (Year: 2015).*
(Continued)

*Primary Examiner* — Ruiping Li
(74) *Attorney, Agent, or Firm* — CANTOR COLBURN LLP

(57) ABSTRACT

A video input interface receives input video data in a normal state. A control input interface receives character data for On Screen Display (OSD) in a setup state. An encoder encodes the character data and stores encoded compressed data in a memory in the setup state. A decoder receives an instruction signal designating the character data to be displayed, reads, and decodes one piece of compressed data corresponding to the instruction signal from the memory, and reproduces the original character data in the normal state. A multiplexer superimposes character data on frame data and outputs the data.

18 Claims, 13 Drawing Sheets

Related U.S. Application Data

16/233,299, filed on Dec. 27, 2018, now abandoned, which is a continuation of application No. PCT/JP2017/023101, filed on Jun. 22, 2017.

(51) Int. Cl.
   *G09G 5/00* (2006.01)
   *G09G 5/02* (2006.01)
   *G09G 5/12* (2006.01)
   *G09G 5/18* (2006.01)
   *G09G 5/36* (2006.01)
   *G09G 5/377* (2006.01)
   *H04N 19/44* (2014.01)

(52) U.S. Cl.
   CPC ............. *G09G 5/001* (2013.01); *G09G 5/026* (2013.01); *G09G 5/12* (2013.01); *G09G 5/18* (2013.01); *G09G 5/363* (2013.01); *G09G 5/377* (2013.01); *H04N 19/44* (2014.11); *G09G 2340/02* (2013.01)

(58) Field of Classification Search
   CPC .......... G09G 3/20; G09G 3/2096; G09G 5/00; G09G 5/026; G09G 5/363; G09G 5/377
   See application file for complete search history.

(56) References Cited

U.S. PATENT DOCUMENTS

| | | | |
|---|---|---|---|
| 2007/0176951 A1* | 8/2007 | Kato | G09G 5/005 345/699 |
| 2009/0051815 A1 | 2/2009 | Ishikawa | |
| 2013/0021435 A1 | 1/2013 | Yamashita et al. | |

FOREIGN PATENT DOCUMENTS

| | | | |
|---|---|---|---|
| CN | 101707677 | A | 5/2010 |
| JP | 06317782 | A | 11/1994 |
| JP | 2001184018 | A | 7/2001 |
| JP | 2002169524 | A | 6/2002 |
| JP | 2002369092 | A | 12/2002 |
| JP | 2003200757 | A | 7/2003 |
| JP | 2005091871 | A | 4/2005 |
| JP | 2006246247 | A | 9/2006 |
| JP | 2008181017 | A | 8/2008 |
| JP | 2009135684 | A | 6/2009 |
| JP | 2012035677 | A | 2/2012 |
| WO | 2015097855 | A1 | 7/2015 |

OTHER PUBLICATIONS

CNIPA 2nd Office Action for corresponding CN Application No. 201780040308.0; Issued on Dec. 20, 2021.
CNIPA Office Action/Search Report for Corresponding CN Application No. 201780040308.0; Dated Mar. 18, 2021.
International Preliminary Report on Patentability corresponding to Application No. PCT/JP2017/023101; Dated Jan. 1, 2019.
International Search Report corresponding to Application No. PCT/JP2017/023101; Dated Aug. 8, 2017.
JP Notice of Reasons for Refusal corresponding to Application No. 2018-525124; Dated Oct. 29, 2019.
U.S. Non Final Office Action corresponding to U.S. Appl. No. 16/233,299 dated Aug. 27, 2020.
U.S. Non Final Office Action corresponding to U.S. Appl. No. 17/196,521 dated Sep. 1, 2022.

* cited by examiner

FIG. 6

| RUN-LENGTH VALUE RL (pixels) | COMPRESSION RATIO (BEFORE COMPRESSION / AFTER COMPRESSION) | NUMBER OF RUN-LENGTH WORDS |
|---|---|---|
| 1 | 1.25 | 0 |
| ~ 17 | 1.25 ~ 0.15 | 1 |
| ~ 257 | 0.2 ~ 0.015 | 2 |
| ~ 4097 | 0.02 ~ 0.0012 | 3 |

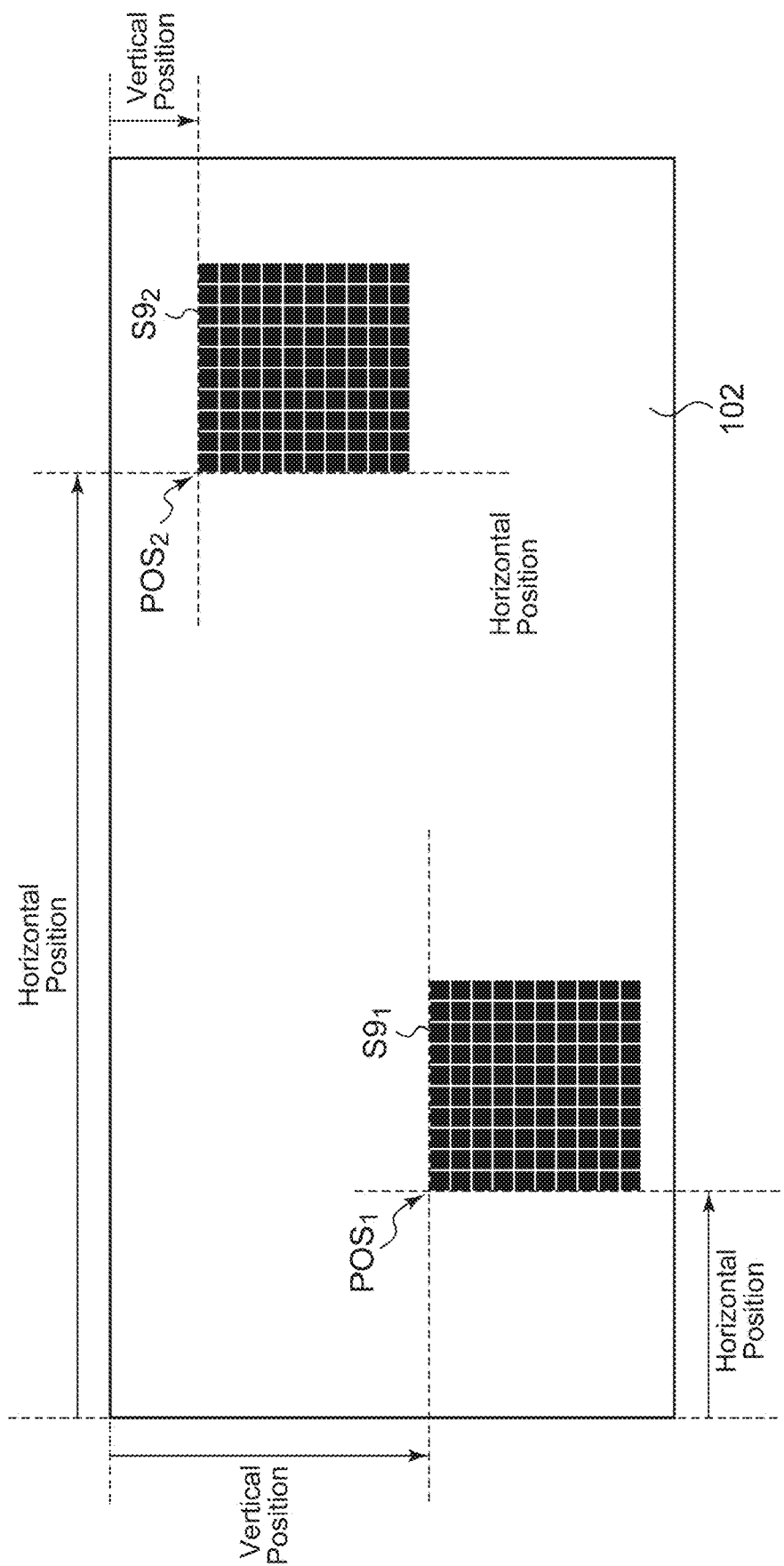

SEMICONDUCTOR APPARATUS FOR IMAGE TRANSMISSION

CROSS REFERENCE TO RELATED APPLICATIONS

The present application is a Continuation Application of U.S. patent application Ser. No. 17/196,521, filed on Mar. 9, 2021; the U.S. patent application Ser. No. 17/196,521 is a Divisional Application of U.S. bypass continuation application Ser. No. 16/233,299, filed on Dec. 27, 2018; the U.S. patent application Ser. No. 16/233,299 is Bypass Continuation of International Application No. PCT/JP2017/023101 filed Jun. 22, 2017; which claims the benefit of the date of the earlier filed Japanese Patent Application No. 2016-126996, filed Jun. 27, 2016, and Japanese Patent Application No. 2017-035487, filed Feb. 27, 2017, the entire content of which is also claimed herein, and the contents of which are also incorporated by reference herein.

BACKGROUND OF THE INVENTION

1. Field of the Invention

The present invention relates to a semiconductor apparatus for image transmission such as a timing controller.

2. Description of the Related Art

FIG. 1 is a block diagram of an image display system. An image display system 100R includes a display panel 102 such as a liquid crystal display panel and an organic electroluminescence (EL) panel, a gate driver 104, source drivers 106, a graphic controller 110, and a timing controller 200R. The graphic controller 110 generates image data to be displayed on the display panel 102. Pixel (RGB) data contained in this image data is transmitted to the timing controller 200R in a serial manner.

The timing controller 200R receives the image data and generates various control/synchronous signals. The gate driver 104 sequentially selects scanning lines $L_S$ of the display panel 102 in synchronization with the signals from the timing controller 200R. Also, the RGB data is supplied to the source drivers 106.

The timing controller 200R includes a reception circuit 202, a transmission circuit 204, and a logic circuit 210. The reception circuit 202 receives image data from the graphic controller 110 in a serial manner. An external read-only memory (ROM) 111 has stored therein ID (identification information), resolution, refresh rate, and the like of the display panel 102. The logic circuit 210 generates control/synchronous signals based on the image data received by the reception circuit 202. The transmission circuit 204 outputs the control signals and the image data to the gate driver 104 and the source drivers 106.

In some cases, the timing controller 200R is required to have an On Screen Display (OSD) function of displaying predetermined characters, graphics, icons, and the like (hereinbelow referred to simply as characters) in addition to the image data received by the reception circuit 202. For this reason, the logic circuit 210 includes an OSD circuit 212.

The ROM 111 has stored therein bitmap data for several characters and icons. The timing controller 200R reads from the ROM 111 bitmap data for characters corresponding to the control signals to be input separately from the image data and displays the characters on the display panel 102.

Problem 1: In the conventional timing controller 200R, bitmap data for characters is required to be stored in the ROM 111. However, since the capacity of the ROM 111 is limited, that causes a problem in which it is difficult to increase the number of pixels for the characters. Also, since the timing controller 200R can display only the characters stored in the ROM 111, it is difficult to correct and add the characters after the product is shipped. In this manner, there is a problem in which the OSD function in the conventional timing controller lacks in flexibility.

Problem 2: Normally, the timing controller 200R and the graphic controller 110 are connected by means of a differential serial interface. During a period from start of activation of the image display system 100R to establishment of a link between the timing controller 200R and the graphic controller 110 by means of the serial interface, no image data can be transmitted, and no image can thus be displayed on the display panel 102. Also, in a case in which the link is once established, and in which the link is then disconnected due to a noise or the like, no image can be displayed on the display panel 102 until the link is established again. A similar problem occurs in a case in which the cable is pulled or disconnected, or in which the serial interface or the graphic controller 110 is partially failed. In the present description, such a state in which no image can be displayed as each of the above states is referred to as "an undisplayable state."

In recent years, there is a tendency toward using a liquid crystal display for a panel of an automobile. A plurality of meters and warning lamps are replaced with the liquid crystal display panel (referred to as a cluster panel). In a case in which a problem occurs in communication between the cluster panel and the graphic controller of an automobile, which causes an undisplayable state, information required for the driver cannot be provided. It is not desirable to leave such an undisplayable state as it is. In addition to the automobile use, it is not desirable to do so for use that requires high reliability such as medical use.

SUMMARY OF THE INVENTION

One embodiment of the present invention is accomplished by taking Problem 1 into consideration thereof, and an illustrative general purpose thereof is to provide a semiconductor apparatus for image data transmission enabling a flexible OSD function to be provided. Another embodiment of the present invention is accomplished by taking Problem 2 into consideration thereof, and an illustrative general purpose thereof is to provide a semiconductor apparatus for image data transmission enabling an abnormal state to be detected.

1. One embodiment of the present invention relates to a semiconductor apparatus. The semiconductor apparatus includes a video input interface structured to receive input video data in a normal state, a control input interface structured to receive character data for On Screen Display (OSD) in a setup state, an encoder structured to encode the character data and store encoded compressed data in a memory in the setup state, a decoder structured to receive an instruction signal designating the character data to be displayed, read and decode one piece of compressed data corresponding to the instruction signal from the memory, and reproduce the character data before encoding in the normal state, and a multiplexer structured to superimpose the character data on the image data and output the data.

Since the encoder and the decoder for the character data for the OSD are incorporated in the semiconductor apparatus, and the character data is given each time the semiconductor apparatus is in the setup state, various kinds of character data can be displayed. The character data can contain graphics, icons, characters, or an arbitrary combination thereof.

The encoder may compress the character data by means of run-length compression. The compressed data may contain at least one piece of segment data, and each piece of segment data may represent a same-color segment including consecutive pixels having a same color. Accordingly, the circuit scale of the encoder can be reduced, and the capacity of the memory can be reduced.

The segment data may contain color data representing a color and a run-length value representing the number of the consecutive pixels. A format length of the run-length value may be variable. Accordingly, the compression ratio can further be improved.

The segment data may contain a color word and at least one run-length word. The color word may contain a separator bit and the color data, and the run-length word may contain the separator bit and the run-length value.

The segment data may contain a color word containing the color data, a word number designation bit representing the number of words of the run-length value, and as many run-length words as the number of words.

The control input interface may receive size data designating a pixel size of the character data and store the size data as well as the compressed data in the memory. Accordingly, the character data of various sizes can be displayed.

The instruction signal may contain positional information designating a position at which the character data is to be displayed. The multiplexer may display the character data at a position corresponding to the positional information. Accordingly, the further flexible OSD function can be provided.

The control input interface may be a serial peripheral interface (SPI) or an inter-integrated circuit (I2C) interface. Since these interfaces are used widely and generally, implementation thereof is easy.

In one embodiment, the semiconductor apparatus may be integrated on one semiconductor substrate. The term "integrated" is used in a case in which all components of a circuit are formed on a semiconductor substrate and in a case in which main components of a circuit are formed on a semiconductor substrate. Some resistors, capacitors, and the like may be provided outside the semiconductor substrate for adjustment of circuit constant.

Another embodiment of the present invention relates to an electronic device. The electronic device may include any of the above semiconductor apparatuses.

Another embodiment of the present invention relates to an in-vehicle display device or a medical display device. Each of these display devices may include any of the above semiconductor apparatuses.

2. One embodiment of the present invention relates to a semiconductor apparatus. The semiconductor apparatus includes a video input interface structured to receive input video data, a memory structured to store reference character data describing a predetermined character that can be contained in the input video data, an image processing circuit structured to generate output video data to be displayed on a display panel based on the input video data, and an abnormality detector structured to determine whether or not there is an abnormality based on the input video data and the reference character data.

According to the embodiment, whether the input video data is received correctly can be determined, and an abnormal state can be detected. The character data can contain graphics, icons, characters, or an arbitrary combination thereof.

The semiconductor apparatus may further include a control input interface provided separately from the video input interface to enable communication with an outside processor.

A display position of the predetermined character may be variable. A control signal that the control input interface receives from the processor may contain positional information indicating the display position of the predetermined character.

The predetermined character may be arranged in a fixed manner at a predetermined position in a user-unrecognizable state. The abnormality detector may perform determination processing per frame. The predetermined character may be arranged in a fixed manner at a predetermined position at the end portion on the display panel that cannot be seen by the user.

A control signal that the control input interface receives from the processor may contain information indicating whether or not the predetermined character is targeted for determination by the abnormality detector. The control signal may contain information indicating whether or not a current frame is targeted for determination by the abnormality detector.

The semiconductor apparatus may support an OSD function. The memory may have stored therein character data for the OSD, and the image processing circuit may superimpose the character data for the OSD on the input video data in an OSD mode.

The reference character data and the character data for the OSD may be used in common. Accordingly, the capacity of the memory can be saved.

The semiconductor apparatus may be able to select the OSD mode or a determination mode in which determination is given by the abnormality detector.

The memory may be a non-volatile memory.

The memory may be a volatile memory. The control input interface may be able to receive character data indicating the predetermined character in a setup state. The semiconductor apparatus may include an encoder structured to encode the character data to generate compressed data and store the compressed data in the memory as the reference character data in the setup state, and a decoder structured to decode the reference character data to reproduce the predetermined character before encoding in a normal state. Since the encoder and the decoder for the character are incorporated in the semiconductor apparatus, and the character data is given each time the semiconductor apparatus is in the setup state, various kinds of character data can be displayed.

The encoder may compress the reference character data by means of run-length compression. The compressed data may contain at least one piece of segment data. Each piece of segment data may represent a same-color segment including consecutive pixels having a same color. Accordingly, the circuit scale of the encoder can be reduced, and the capacity of the memory can be reduced.

The control input interface may be a serial peripheral interface (SPI) or an inter-integrated circuit ($I^2C$) interface. Since these interfaces are used widely and generally, implementation thereof is easy.

When an abnormality is detected by the abnormality detector, the semiconductor apparatus may interrupt the processor. This enables notification of generation of an undisplayable state to be given to the processor. The processor may operate the semiconductor apparatus in the determination mode before generation of the undisplayable state, and when the processor is interrupted, the processor may operate the semiconductor apparatus in the OSD mode and compensate for a loss of the input video data by means of the OSD with use of the control input interface.

In one embodiment, the semiconductor apparatus may be integrated on one semiconductor substrate. The term "integrated" is used in a case in which all components of a circuit are formed on a semiconductor substrate and in a case in which main components of a circuit are formed on a semiconductor substrate. Some resistors, capacitors, and the like may be provided outside the semiconductor substrate for adjustment of circuit constant.

Another embodiment of the present invention relates to an electronic device. The electronic device may include any of the above semiconductor apparatuses.

Another embodiment of the present invention relates to an in-vehicle display device or a medical display device. Each of these display devices may include any of the above semiconductor apparatuses.

It is to be noted that any arbitrary combination or rearrangement of the above-described structural components and so forth is effective as and encompassed by the present embodiments. Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 6 illustrates compression ratios of the same-color segments when a second data structure in FIG. 5B is employed;

FIG. 15 illustrates the display panel on which two pieces of character data are displayed.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present description, "a state in which a member A is connected to a member B" includes a case in which the member A and the member B are connected physically directly and a case in which the member A and the member B are connected indirectly via another member which has no substantial effect on the electric connection state between the members or which does not impair a function and an effect obtained by the connection between the members.

Similarly, "a state in which a member C is provided between a member A and a member B" includes a case in which the member A and the member C, or the member B and the member C, are connected directly and a case in which the member A and the member C, or the member B and the member C, are connected indirectly via another member which has no substantial effect on the electric connection state between the members or which does not impair a function and an effect obtained by the connection between the members.

First Embodiment

Figure 1:
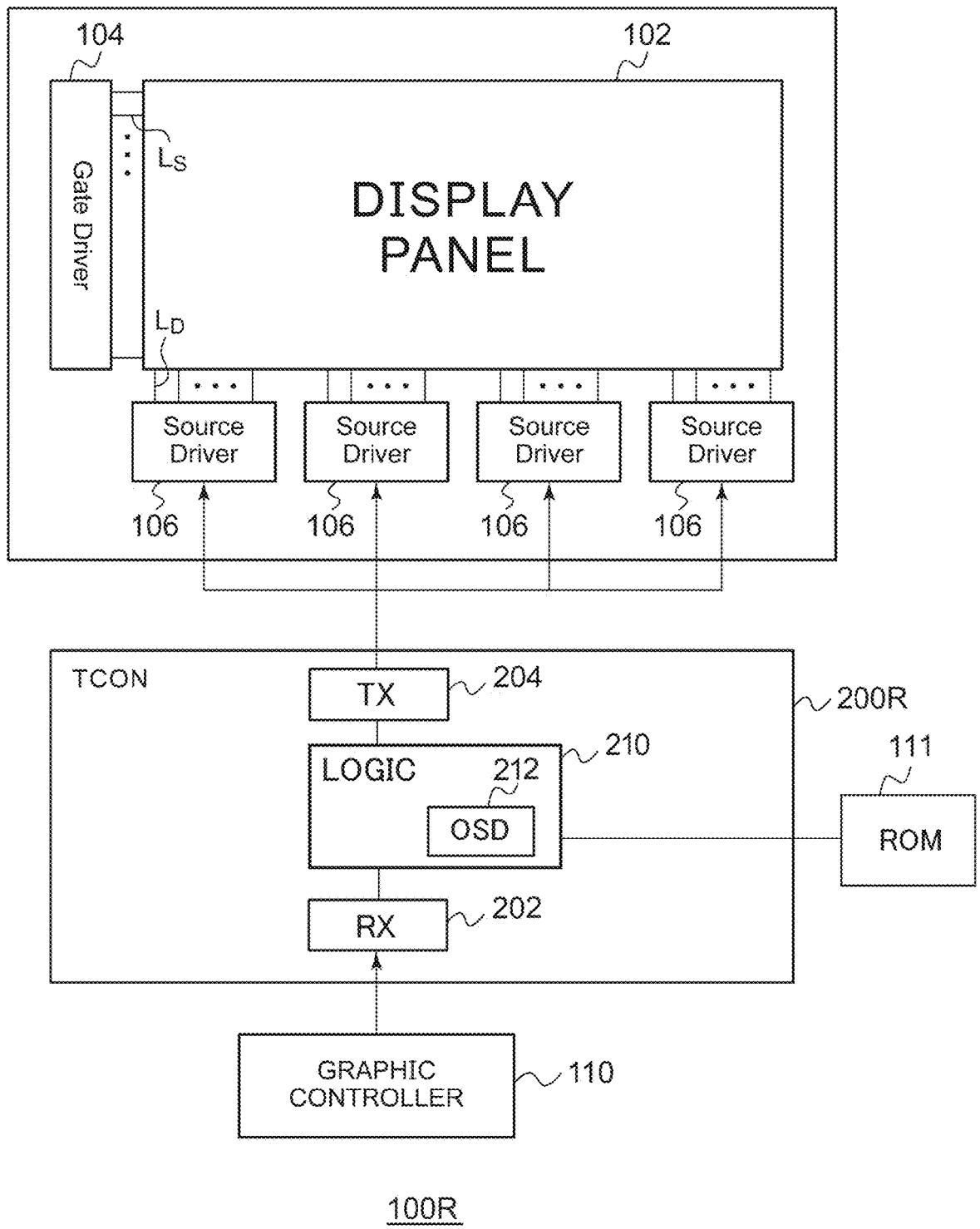
FIG. 1 is a block diagram of an image display system.
Figure 2:
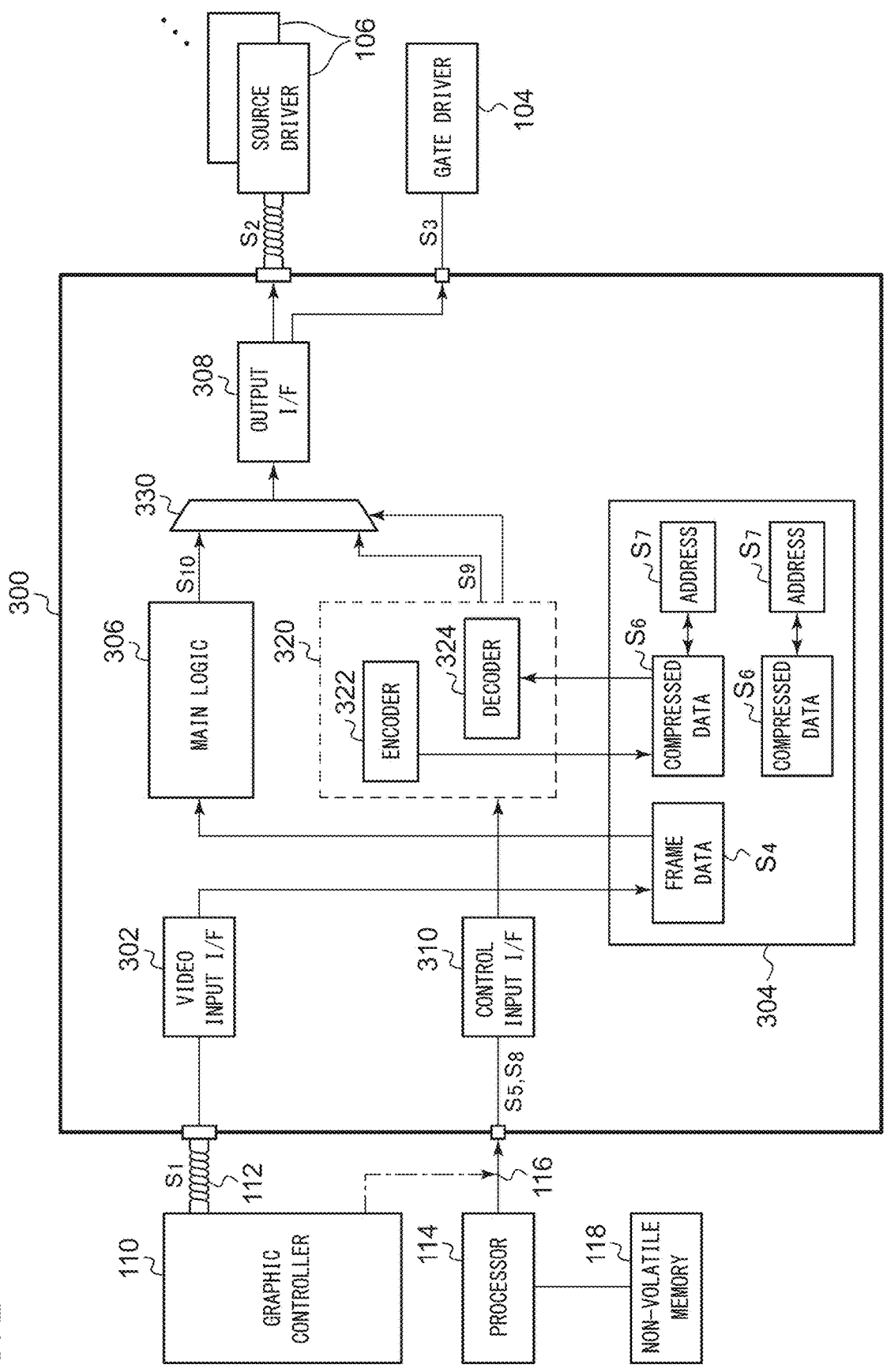
FIG. 2 is a block diagram of a timing controller according to a first embodiment.

FIG. 2 is a block diagram of a timing controller 300 according to a first embodiment. In a similar manner to that in the image display system 100R in FIG. 1, the timing controller 300 receives input video data $S_1$ from a graphic controller 110, supplies output video data $S_2$ to one or a plurality of source driver(s) 106, and outputs a control/synchronous signal $S_3$ to a gate driver 104 and one or the plurality of source driver(s) 106. The timing controller 300 may be a functional integrated circuit (IC) integrated on one semiconductor substrate.

The timing controller 300 includes a video input interface 302, a memory 304, a main logic 306, an output interface 308, a control input interface 310, and an OSD processor 320.

The video input interface 302, the main logic 306, and the output interface 308 are circuit blocks related to display of image data from the graphic controller 110 and may be the same as those included in the conventional timing controller 200R. The video input interface 302 is connected to the graphic controller 110 via a first line 112 and receives the input video data $S_1$. As an interface between the video input interface 302 and the graphic controller 110, a differential high-speed serial interface such as a low voltage differential signaling (LVDS) can be employed. The input video data $S_1$ received by the video input interface 302 is stored as frame data $S_4$ in the memory 304. The memory 304 may be a static random access memory (SRAM) without limitation.

The main logic 306 performs various kinds of signal processing to the frame data $S_4$. The signal processing of the main logic 306 is not particularly limited, and a known technique may be used such as γ (gamma) correction, frame rate control (FRC) processing, and RGB mapping. The output interface 308 outputs the output video data $S_2$ processed by the main logic 306 to the source driver 106. The main logic 306 also generates the control/synchronous signal $S_3$ that is to be supplied to the gate driver 104 and the source driver 106.

The control input interface 310, the OSD processor 320, and a multiplexer 330 are provided in relation to an OSD function.

The timing controller 300 is in a setup state immediately after turning on the power. For example, the timing controller 300 has a period for setting parameters and the like of the γ correction and the RGB mapping (initializing period) at the time of the power-on as a previous stage to reception and output of the video input data to a panel. A part of the initializing period may be regarded as the setup state.

Alternatively, giving a command from an outside to the timing controller 300 may enable the setup state to be set. For example, a register associated with the setup state may be provided inside a timing controller 300a, and 1 may be written in the register from the outside (for example, a processor 114) to shift a state to the setup state. In this case, the state can be shifted to the setup state not only immediately after turning on the timing controller 300 but also at an arbitrary time.

The control input interface 310 receives character data $S_5$ for On Screen Display (OSD) from the processor 114 in the setup state. The character data $S_5$ is stored in a non-volatile memory 118 and is transmitted via the processor 114 to the control input interface 310. The character data $S_5$ may be monochrome or colored bitmap data without limitation. Also, the representation form of the character data $S_5$ is an arbitrary form such as icons, graphics, and characters. As the control input interface 310, a register-access-type interface can be used. Favorable examples thereof include, but are not limited to, a serial peripheral interface (SPI) and an inter-integrated circuit (I2C) interface. Although FIG. 2 illustrates a configuration in which the processor 114 is provided separately from the graphic controller 110, the function of the processor 114 may be incorporated into the graphic controller 110.

The OSD processor 320 includes an encoder 322 and a decoder 324. In the setup state, the encoder 322 encodes the character data $S_5$ and stores encoded compressed data $S_6$ in the memory 304. Also, address information $S_7$ representing an address at which the compressed data $S_6$ has been stored is stored to correspond to the character data $S_5$.

In the setup state, a plurality of pieces of character data $S_5$ may be input. In this case, an ID may be given to each piece of character data $S_5$, correspond to the compressed data $S_6$ and the address information $S_7$, and be stored in the memory 304.

In a normal state, the control input interface 310 receives an instruction signal $S_8$ containing an ID designating character data to be displayed. The decoder 324 refers to the address information $S_7$ corresponding to the ID and reads from the memory 304 and decodes a piece of compressed data $S_6$ corresponding to the ID information to reproduce original character data $S_9$.

The multiplexer 330 superimposes the character data $S_9$ on frame data $S_{10}$ output from the main logic 306 and outputs the data to the output interface 308.

A position at which the character data $S_9$ is to be displayed is preferably controllable. The instruction signal $S_8$ may contain positional information POS designating the position at which the character data $S_9$ is to be displayed. The multiplexer 330 displays the character data $S_9$ at the position corresponding to the positional information POS.

The entire configuration of the timing controller 300 has been described above. Next, compression of the character data $S_5$ will be described. For compression of the character data $S_5$, run-length compression can be used.

Figure 3:
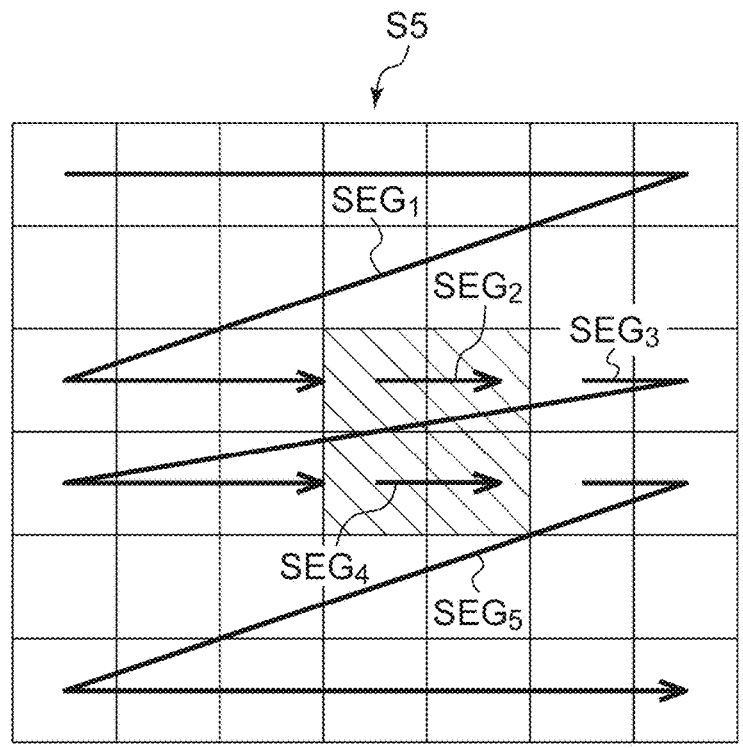
FIG. 3 describes run-length compression of character data.

FIG. 3 describes run-length compression of the character data $S_5$. Although the character data of 7×6 pixels is illustrated in FIG. 3 to simplify the description, actual character data may contain 50×50 pixels, 100×100 pixels, or as many pixels as another number. Also, the number of pixels in the vertical direction and the number of pixels in the horizontal direction may differ.

In the run-length compression, consecutive pixels having the same color (referred to as a same-color segment) are converted into color data CD and a run-length value RL representing a value for the consecutive number. In the run-length compression, pixels are processed from the upper line to the lower line, and in each line, from the left end to the right end. Each of the arrows in FIG. 3 represents a same-color segment SEG.

The color data CD can be represented by 24 bits consisting of 8 bits of each of R, G, and B.

The character data $S_5$ in FIG. 3 is divided into five same-color segments $SEG_1$ to $SEG_5$. The run-length values RL of the respective same-color segments $SEG_1$ to $SEG_5$ are 17, 2, 5, 2, and 16. The same-color segments $SEG_1$, $SEG_3$, and $SEG_5$ have a first color while the same-color segments $SEG_2$ and $SEG_4$ have a second color. Accordingly, the compressed data $S_6$ corresponding to one piece of character data $S_5$ can be represented by one piece of segment data SEG or a combination of a plurality of pieces of segment data SEG.

Figure 4:
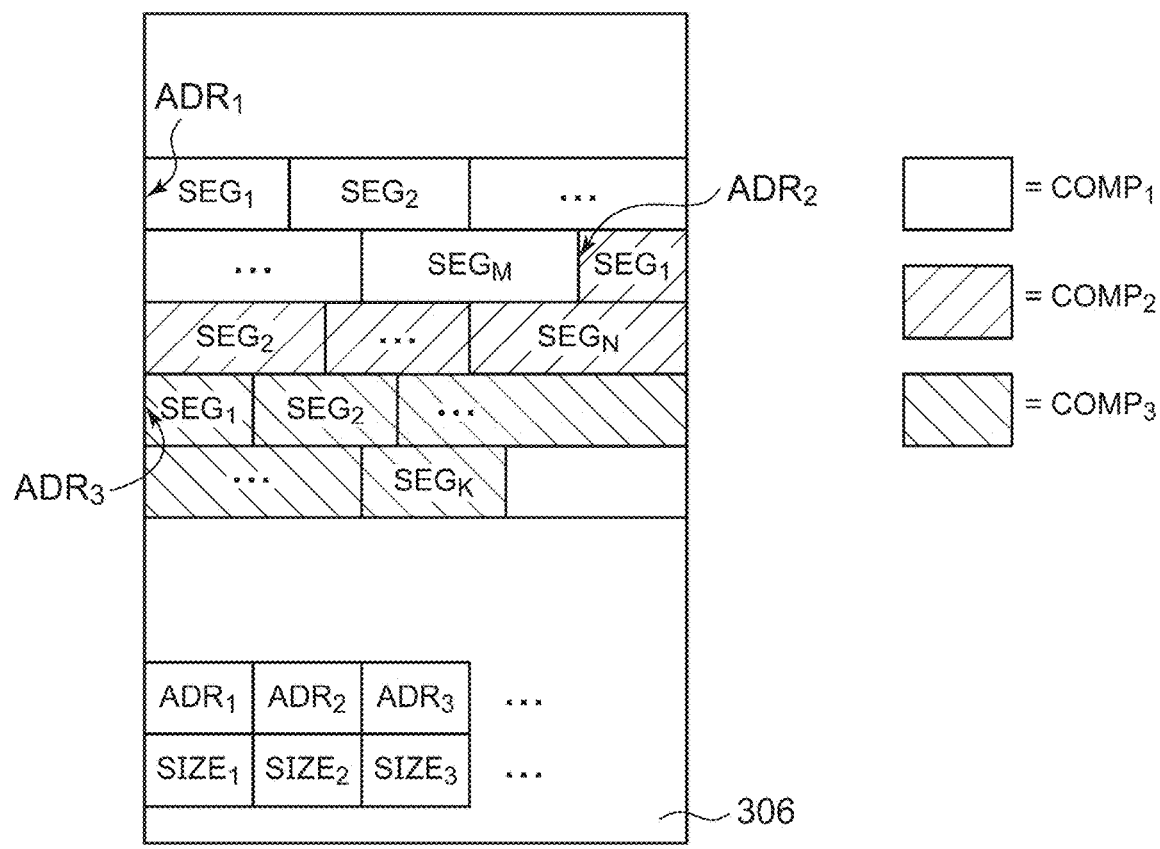
FIG. 4 illustrates a state in which compressed data is stored in a memory.

FIG. 4 illustrates a state in which compressed data COMP ($S_6$) is stored in the memory 304. First compressed data $COMP_1$ contains M pieces of segment data representing M same-color segments, second compressed data $COMP_2$ contains N pieces of segment data, and third compressed data $COMP_3$ contains K pieces of segment data. An initial address of each piece of compressed data COMP is stored as address information ADR in the memory 304.

A size (the number of pixels) of the character data $S_5$ may be fixed to 50 pixels×50 pixels, for example. However, to provide additional flexibility, the size may be selectable from a plurality of options by a user. For example, the timing controller 300 may be configured to support two sizes of 50×50 pixels and 100×100 pixels. In this case, in the setup state, size data SIZE designating the size may be input as well as the character data $S_5$. The size data SIZE is stored in the memory 304 to correspond to the ID of the character data $S_5$.

To provide additional flexibility, the user may be able to designate the size of the character data $S_5$ freely. For example, in the setup state, the size data SIZE may be input to designate the number of vertical pixels and the number of horizontal pixels, as well as the character data $S_5$. The size data is stored in the memory 304 to correspond to the ID of the character data $S_5$.

Figure 5A:
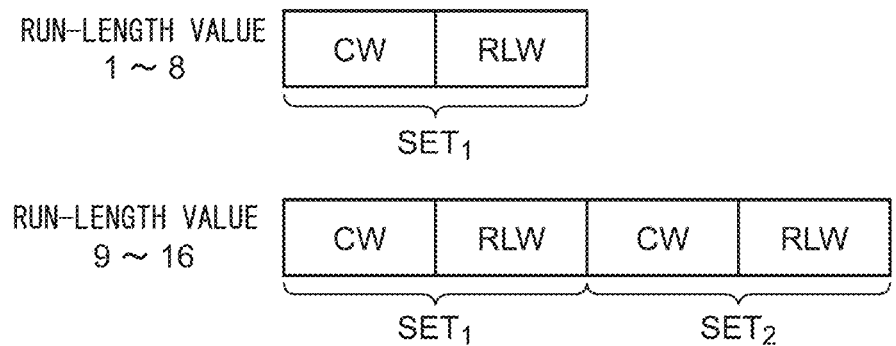
FIG. 5A to FIG. 5C illustrate data structures of same-color segments.
Figure 5B:
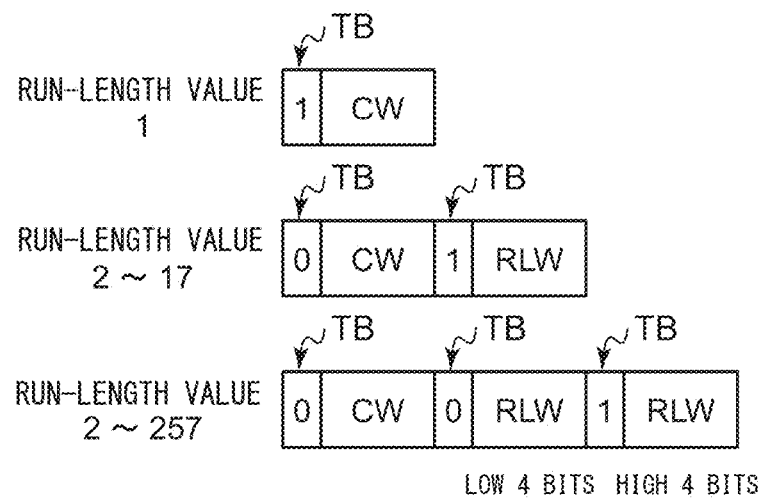
Figure 5C:
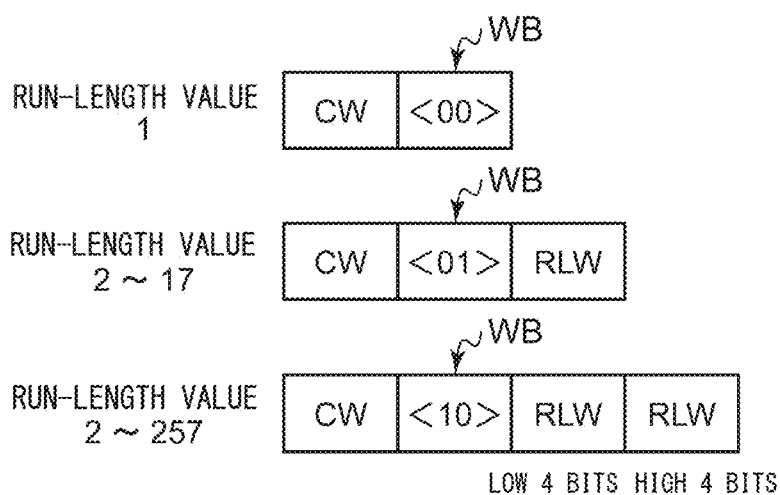

FIG. 5A to FIG. 5C illustrate data structures of the same-color segments SEG. FIG. 5A illustrates a first data structure. Data of each same-color segment SEG (segment data) contains one or a plurality of set(s) SET of a color word CW and a run-length word RLW.

In a case in which the number of bits of the run-length word RLW is 3, and in which the consecutive number (run-length value) is never zero, run-length words RLW <000> to <111> can represent run-length values 1 to 8.

In a case in which the run-length value RL is 8 or less as in the case of the same-color segment $SEG_2$ ($SEG_3$ or $SEG_4$), the compressed data thereof is represented by one set SET$_1$ containing one color word CW and one run-length word RLW as illustrated in FIG. 5A.

In a case in which the run-length value RL of a same-color segment SEG is 9 or more, the same-color segment SEG contains a plurality of sets each having the same color data CD. For example, in a case of the same-color segment SEG$_1$ whose run-length value RL is 17, the consecutive number is divided into 16 and 1. That is, the same-color segment SEG$_1$ is represented by two sets SET$_1$ and SET$_2$. In the two sets SET$_1$ and SET$_2$, the color words CW are the same, and the run-length word RLW of the first set is <111> while the run-length word RLW of the second set is <011>.

In a case in which the run-length value RL is 17 to 24, the consecutive number can be divided into 8+8+a (where 1≤a≤8), and the same-color segment SEG can contain three sets SET.

Meanwhile, although the number of bits for each word is 3 here to facilitate understanding, the number is not limited to this and may be 4 to 6 bits or so. The optimal number of bits for each word may be determined to have a high compression ratio in consideration of the shape and the size of the character data.

FIG. 5B illustrates a second data structure. In the second data structure, the format length of the run-length value RL is variable.

At the top of each of the color word CW and the run-length word RLW, a separator bit representing a boundary of the same-color segment SEG is provided. In the example in FIG. 5B, the separator bit is a termination bit TB representing a termination of the same-color segment, and the value 1 represents the termination. The separator bit may represent a start point instead of the termination.

The same-color segment whose run-length value RL is 1 may contain only the color word CW whose termination bit TB is 1 and no run-length word RLW. This enables the compression ratio to be further raised. In this case, the 4-bit run-length words RLW <0000> to <1111> can represent run-length values 2 to 17.

For example, in a case in which the character data represents characters, anti-aliasing may be provided to display a smooth font, and the same-color segment whose run-length value RL is 1 tends to be generated. By dispensing with the run-length word RLW to represent "run-length value RL=1," the compression ratio especially in the case of the characters can be raised.

In a case in which "termination bit TB=1" is added to the second run-length word RLW, the run-length value is represented by 2 words and 8 bits. For example, the first run-length word RLW may be allocated to the low 4 bits while the second run-length word RLW may be allocated to the high 4 bits, and vice versa. The 8-bit run-length values RL<00000000> to <11111111> obtained by combining the two run-length words RLW represent run-length values 2 to 257.

Meanwhile, by allocating the precedent run-length word RLW to the low bits of the run-length value, at the time of decoding, a pixel group corresponding to the run-length value RL represented by the precedent run-length word RLW can be marked (or rasterized) before the subsequent run-length word RLW is read out.

In a case in which "termination bit TB=1" is added to the third run-length word RLW, the run-length value RL is represented by 3 words and 12 bits.

In the first data structure in FIG. 5A, since each set SET contains the color word CW of the same value, this is redundant, and the compression ratio may be lowered. Conversely, in the second data structure, since there is no redundancy of the color word CW, the compression ratio can be raised.

FIG. 5C illustrates a third data structure. In the third data structure, as well as in the second data structure, the format length of the run-length value RL is variable. In the third data structure, the segment data does not contain the termination bit TB for each word but contains a bit WB designating the number of words of the run-length value RL (word number designation bit). Although the number of bits of the word number designation bit WB is not particularly limited, the number of bits is 2 in this example. In a case in which the run-length value RL is 2 to 17, the word number designation bit WB is 1 (<01> in a case of a binary number), and the segment data contains one run-length word RLW. In a case in which the run-length value RL is 2 to 257, the word number designation bit WB is 2 (<10> in a case of a binary number), and the segment data contains two run-length words RLW. The initial run-length word RLW may represent the low 4 bits of the run-length value RL while the second run-length word RLW may represent the high 4 bits of the run-length value RL.

In the second data structure in FIG. 5B, since the total number of termination bits TB increases as the number of words of the run-length value increases, the compression ratio tends to be lowered. Conversely, in the third data structure, even when the number of words of the run-length value increases, the bit number of the word number designation bit WB is constant, and the compression ratio can thus be restricted from being lowered. Meanwhile, the second data structure or the third data structure may be selected to have a high compression ratio in consideration of the shape and the size of the character data.

As another data structure, the following structure is considered. For example, in the second or third data structure, the sum of the plurality of run-length words RLW may be the run-length value RL in a similar manner to that of the first data structure. For example, in a case in which the segment data contains two run-length words RLW whose values are <0001> and <1111>, the run-length value RL may be 3+17=20.

The configuration of the timing controller 300 has been described above. Next, an operation thereof will be described.

1. Setup State

When a device or a system including the timing controller 300 is activated, the timing controller 300 is in a setup state. The processor 114 transmits the character data S$_5$ as well as the size data SIZE to the control input interface 310. The encoder 322 compresses the received character data S$_5$ and stores the compressed data S$_6$ in the memory 304. In a case in which there are a plurality of pieces of character data S$_5$, the plurality of pieces of character data are compressed sequentially.

2. Normal State

The graphic controller 110 transmits the input video data S$_1$ via the first line 112 to the video input interface 302. The timing controller 300 processes the input video data S$_1$ and controls the gate driver 104 and the source drivers 106 to display an image on the display panel.

In a case in which a character is to be displayed on the display panel with use of the OSD function, the processor 114 transmits the instruction signal S$_5$ separately from the input video data S$_1$. The instruction signal S$_5$ contains the ID information designating one of the plurality of pieces of character data $S_5$ transmitted to the timing controller 300 in the setup state and the positional information POS designating a display position.

Figure 7:
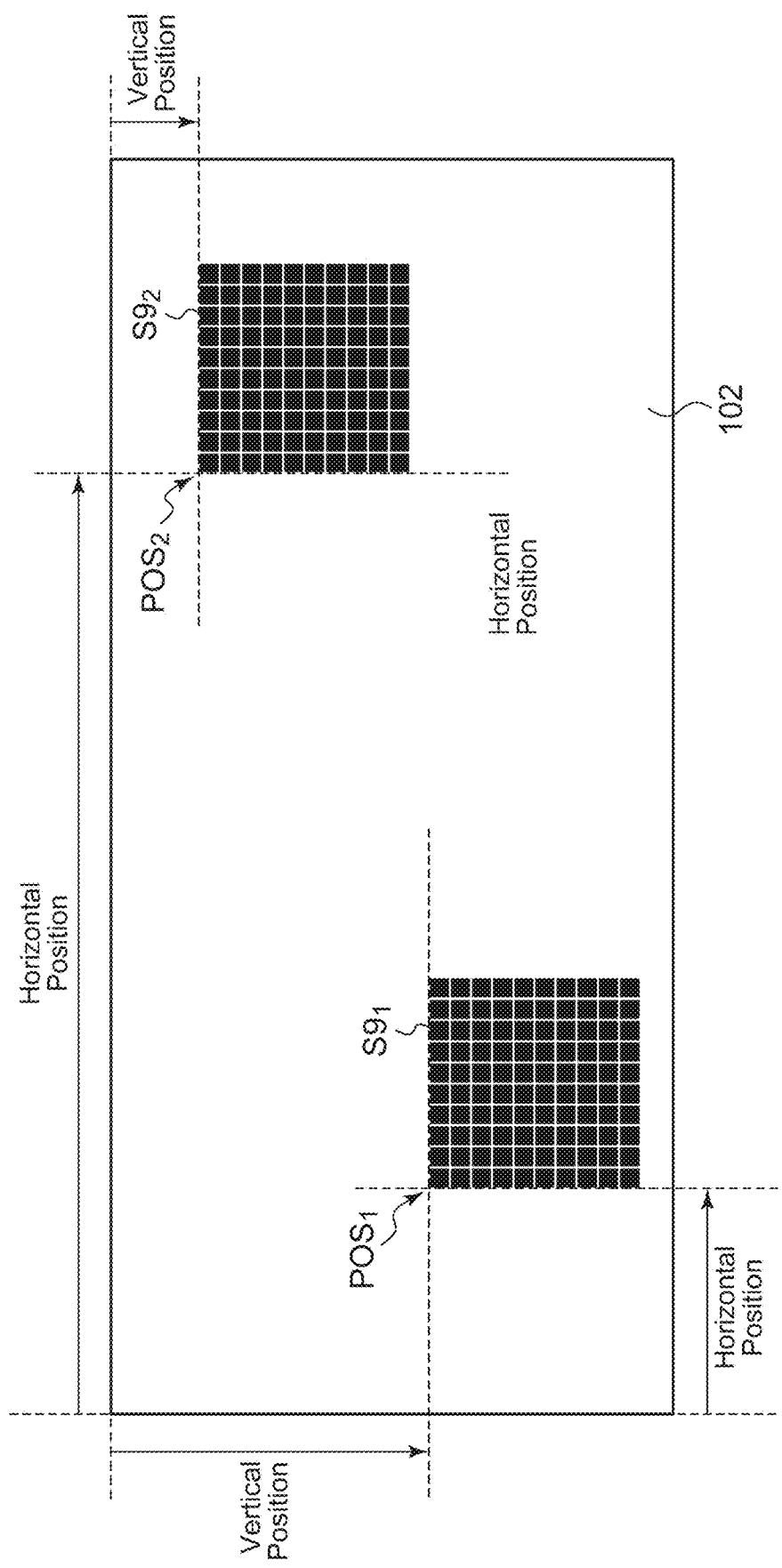
FIG. 7 illustrates a display panel on which two pieces of character data are displayed.

The decoder 324 refers to the address information $S_7$ corresponding to the ID information and accesses the corresponding compressed data $S_6$. The decoder 324 then decodes the compressed data $S_6$ based on the size data SIZE to extract the character data $S_9$ in a bitmap format. The multiplexer 330 displays the character data $S_9$ at a position designated by the positional information POS. FIG. 7 illustrates the display panel 102 on which two pieces of character data $S_{91}$ and $S_{92}$ are displayed.

The multiplexer 330 may substitute the luminance value of the frame data $S_{10}$ at a region at which the character data $S_9$ is arranged with the luminance value of the character data $S_9$.

The operation of the timing controller 300 has been described above. Next, advantages thereof will be described.

Since the encoder and the decoder for the character data for the OSD are incorporated in the timing controller 300, and the character data $S_5$ is given each time the timing controller 300 is in the setup state, various kinds of character data can be displayed.

Also, since the character data is stored in the memory 304 in a compressed form, the capacity of the memory 304 can be reduced, which leads to cost reduction. FIG. 6 illustrates the compression ratios of the same-color segments when the second data structure in FIG. 5B is employed. Here, the bit wide of the run-length word RLW is 4 bits. As the run-length value RL is higher, the higher compression ratio is obtained. In a case in which the run-length value is 1 or 2, the segment data is larger than the data volume of the original pixel data. However, in most of characters, icons, and graphics, the run-length value is 1 or 2 only in a case of anti-aliasing or the like, and the probability of occurrence thereof is extremely low. Accordingly, the compression ratio of the entire character data can sufficiently be raised.

Also, while the ROM 111 storing the character data for the OSD is required to be provided on the side of the timing controller 200R in FIG. 1, the character data is not required to be stored in the ROM in the timing controller 300 in FIG. 2. Since the memory 304 such as an SRAM is more reasonable than the ROM, the cost can be reduced.

In the system in FIG. 1, an OTP (one time programmable) ROM is used for the ROM 111. Hence, in a case in which the character data for the OSD is to be changed or added, the ROM 111 is required to be replaced. However, in many cases, it is impossible to replace the ROM, or even when it is possible, the cost will be extremely high.

In many systems, to the processor 114 is connected not the one time ROM but the rewritable non-volatile memory 118 such as a hard disk, a solid state drive (SSD), an electrically erasable programmable read-only memory (EEPROM), and a flash memory. Accordingly, in the timing controller 300 in FIG. 2, the character for the OSD can be changed or added by changing or adding the character data stored in the non-volatile memory 118.

Figure 8A:
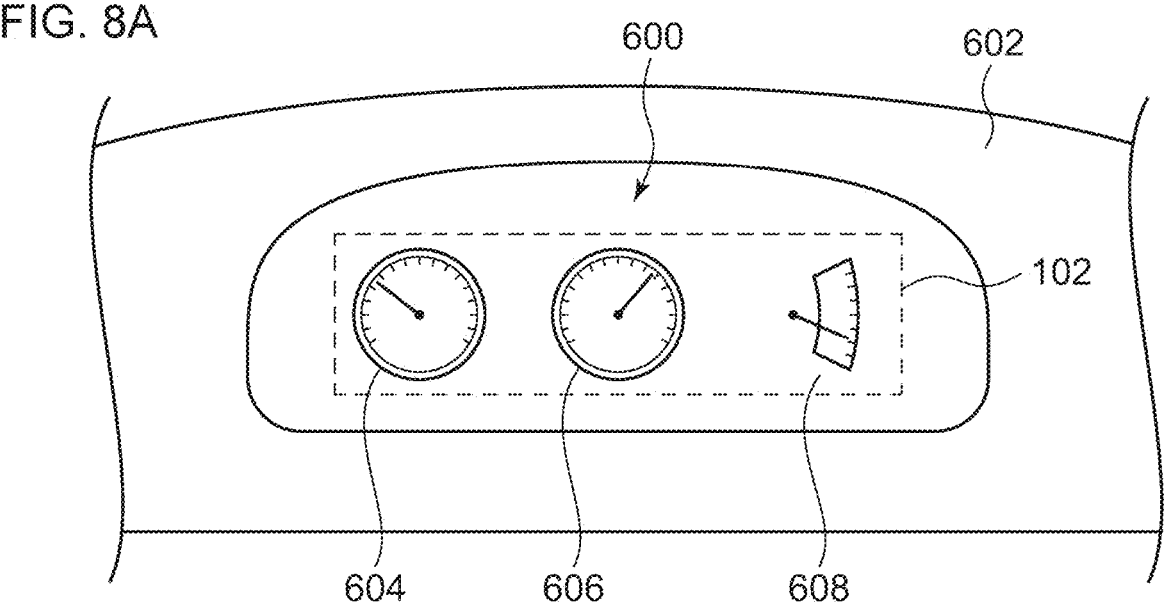
FIG. 8A to FIG. 8C illustrate an in-vehicle display device using the timing controller.

Next, use of the timing controller 300 will be described. FIG. 8A illustrates an in-vehicle display device 600 using the timing controller 300. The in-vehicle display device 600 is buried in a console 602 on the cockpit front face. The in-vehicle display device 600 receives from the vehicle processor and displays the input video data $S_1$ including a speed meter 604, a tachometer 606 indicating the number of revolutions of the engine, a fuel remaining amount 608, and, in a case of a hybrid car or an electric car, a remaining amount of a battery (FIG. 8A).

Figure 8B:
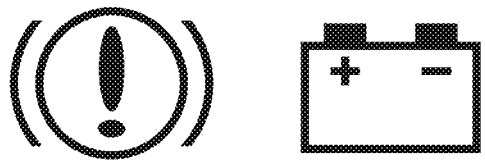

Conventionally, an indicator lamp or a warning lamp (hereinbelow referred to simply as a warning lamp) indicating a certain abnormality or a dead battery as illustrated in FIG. 8B is displayed outside the display panel with use of an independent LED. The reason for not displaying the warning lamp on the display panel is as follows. That is, the timing controller 300 and the graphic controller 110 are connected by means of a differential serial interface. During a period from start of activation of the system to establishment of a link between the timing controller 300 and the graphic controller 110 by means of the serial interface, no image data can be transmitted, and no image can thus be displayed on the display panel 102. Also, in a case in which the link is once established, and in which the link is then disconnected due to a noise or the like, no image can be displayed on the display panel 102 until the link is established again. A similar problem occurs in a case in which the cable is pulled or disconnected, or in which the serial interface or the graphic controller 110 is partially failed. Such a state in which no image can be displayed as each of the above states is referred to as "an undisplayable state."

Since the warning lamp has important information that should be given to the driver, the warning lamp is required to be lit even in the undisplayable state. Under such circumstances, the warning lamp is required to be provided outside the display panel.

Conversely, with use of the timing controller 300 according to the embodiment, the warning lamp can be displayed on the display panel as the character data $S_5$ for the OSD. The reason for this is that communication by means of the differential serial interface is not required for the OSD display. Since this can dispense with the LED and the driving circuit thereof, the cost can be reduced. Also, since a standard function of the ECU such as $I^2C$ can be used, the cost can further be reduced.

Figure 8C:
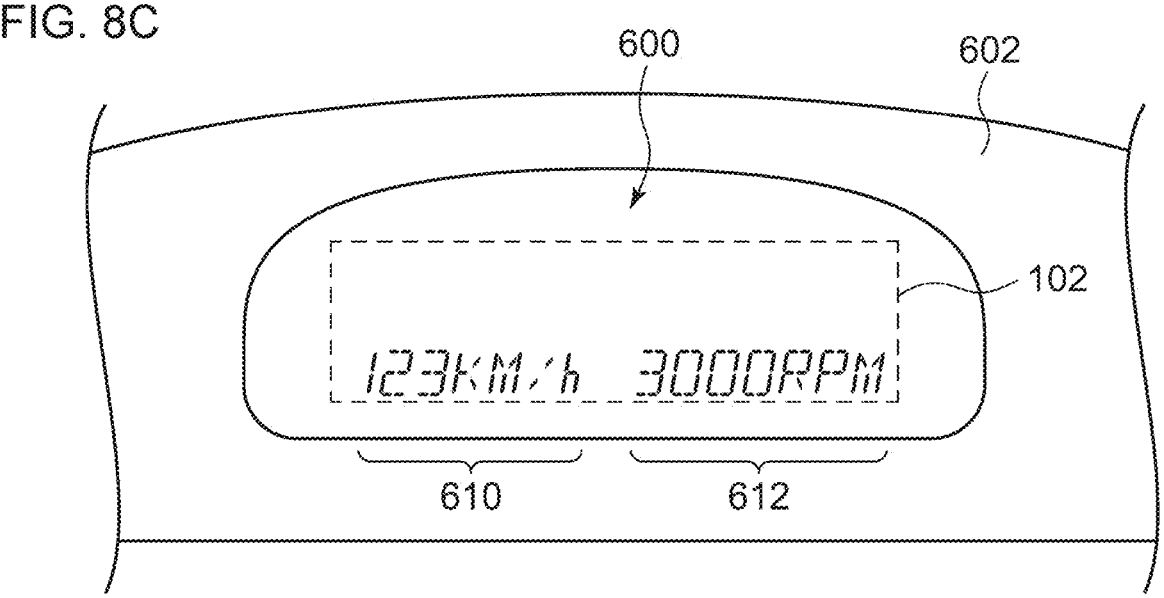

Also, in a case in which the in-vehicle display device 600 is in a state in which no input video data $S_1$ can be displayed (undisplayable state), the display panel 102 will black out, which poses a problem for driving. To solve the problem, numbers, alphabets, and the like may be prepared as the character data $S_5$ for the OSD. As illustrated in FIG. 8C, in a case in which a certain abnormality occurs during driving, and in which the speed meter 604 and the tachometer 606 cannot be displayed, car speed information 610 and information 612 about the number of revolutions of the engine can be displayed in real time with use of the OSD function, and the safety can be improved.

Also, during a period until the input video data $S_1$ can be displayed after the car is ignited to cause the in-vehicle display device 600 to be activated, a character string such as "PLEASE WAIT . . . " and current time can be displayed with use of the OSD function.

The timing controller 300 can be used for a medical display device. The medical display device displays information required for doctors and nurses during an examination, treatment, or operation. In the medical display device, important information (such as a heart rate and blood pressure of a patient) can be displayed with use of the OSD function even in a state in which no input video data $S_1$ can be displayed.

Figure 9:
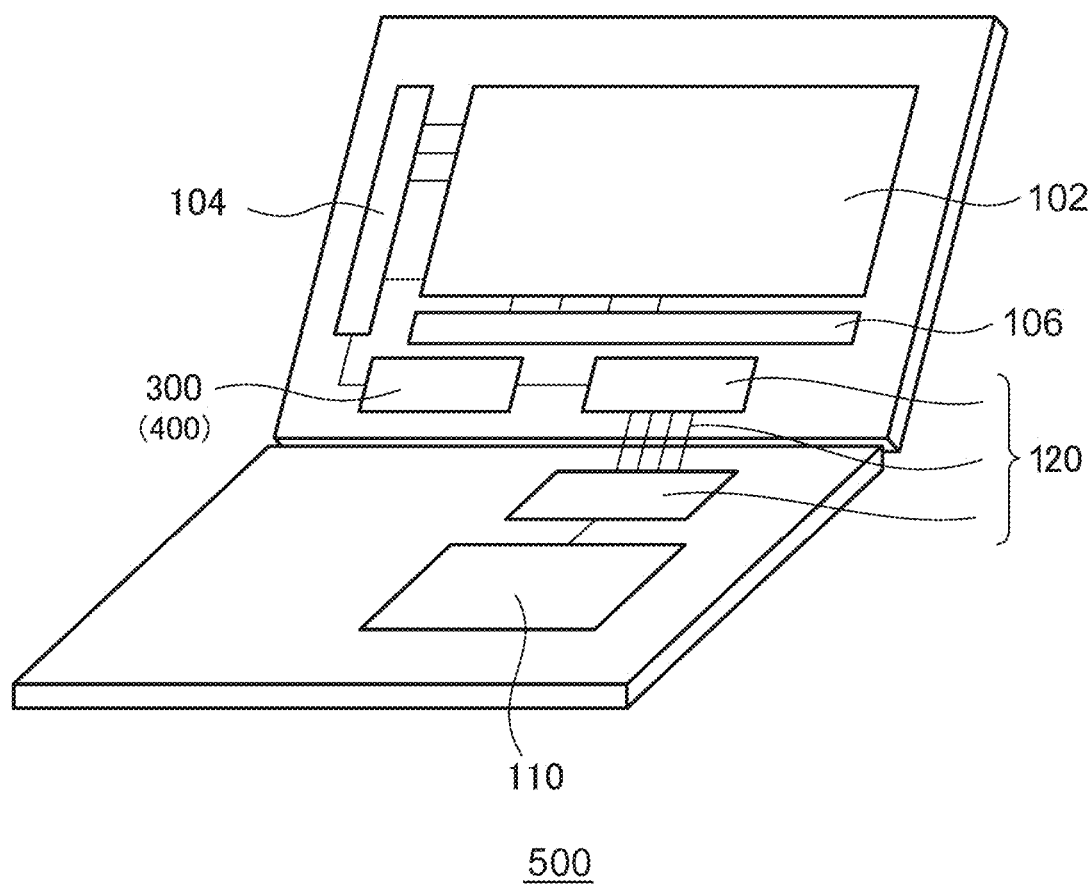
FIG. 9 is a perspective view illustrating an electronic device.

FIG. 9 is a perspective view illustrating an electronic device 500. The electronic device 500 in FIG. 9 can be a laptop computer, a tablet terminal, a smartphone, a portable game machine, an audio player, or the like. The electronic device 500 includes the graphic controller 110, the display panel 102, the gate driver 104, and the source drivers 106 incorporated in a chassis 502. Between the timing controller 300 and the graphic controller 110, a transmission device 120 including a differential transmitter, a transmission path, and a differential receiver may be provided.

Modification examples of the first embodiment will be described.

First Modification Example

Although the character data $S_9$ for the OSD is displayed to be superimposed on the frame data $S_{10}$ in the embodiment, the present invention is not limited to this, and the character for the OSD may be displayed to be transparent or translucent by means of alpha blending. In this case, the color data CD may be an a value representing the transparency. Consequently, the character data $S_9$ can be transparent or translucent and be displayed to be superimposed on the frame data $S_{10}$.

Second Modification Example

The encoder 322 may further compress the 24-bit color data CD with use of a color palette. For example, when the compressed data $S_6$ is constituted by sixteen or less colors, a 4-bit color palette is generated. Each time a segment of a new color appears, the encoder 322 adds the color to the palette and holds an identifier thereof in the color palette as the color data CD. In a case in which a same-color segment of a color included in the color palette appears, the encoder 322 holds an identifier of the color as the color data CD. Accordingly, the segment data can further be compressed.

Third Modification Example

The type of the control input interface 310 is not limited to the register access type. For example, differential serial transmission may be used in a similar manner to that in the first line 112, or the control input interface 310 can be designed as an arbitrary interface.

Fourth Modification Example

Although the character data $S_5$ in the setup state and the instruction signal $S_5$ in the normal state are received by the common control input interface 310 in the embodiment, these may be received by separate interfaces.

Fifth Modification Example

Although the run-length compression, which is easily implemented, has been described in the embodiment, other image compression may be used. Also, error detection such as cyclic redundancy check (CRC) may be added to the character data $S_5$, the instruction signal $S_8$, and the like. Instead of the CRC, error detection such as parity and checksum may be added.

Second Embodiment

Figure 10:
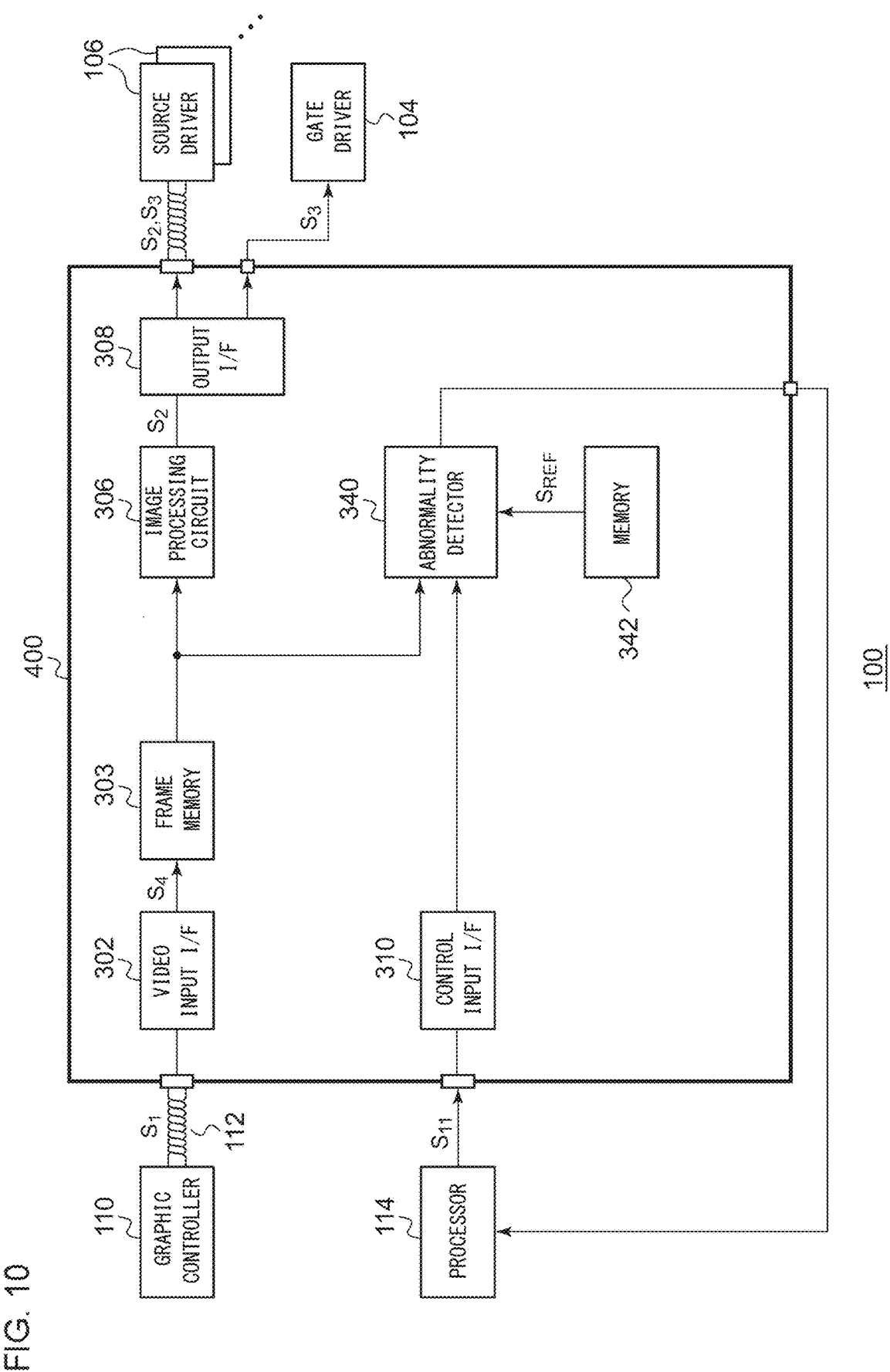
FIG. 10 is a block diagram of an image display system including a timing controller according to a second embodiment.

FIG. 10 is a block diagram of an image display system 100 including a timing controller 400 according to a second embodiment. In a similar manner to that in the image display system 100R in FIG. 1, the timing controller 400 receives the input video data $S_1$ from the graphic controller 110, supplies the output video data $S_2$ to one or the plurality of source driver(s) 106, and outputs the control/synchronous signal $S_3$ to the gate driver 104 and one or the plurality of source driver(s) 106. The timing controller 400 may be a functional integrated circuit (IC) integrated on one semiconductor substrate.

The timing controller 400 includes the video input interface 302, a frame memory 303, an image processing circuit 306, the output interface 308, the control input interface 310, an abnormality detector 340, and a memory 342.

The video input interface 302, the frame memory 303, the image processing circuit 306, and the output interface 308 are circuit blocks related to display of image data from the graphic controller 110 and may be the same as those included in the conventional timing controller 200R. The video input interface 302 is connected to the graphic controller 110 via a signal line 112 and receives the input video data $S_1$. As an interface between the video input interface 302 and the graphic controller 110, a differential high-speed serial interface such as a low voltage differential signaling (LVDS) can be employed. The input video data $S_1$ received by the video input interface 302 is stored as the frame data $S_4$ in the frame memory 303. The frame memory 303 may be a static random access memory (SRAM) without limitation. Meanwhile, the frame memory 303 may be a frame buffer holding one-frame image data or a line buffer holding data for one or a plurality of line(s), and the frame data $S_4$ may referred to as line data.

The image processing circuit 306 performs various kinds of signal processing to the frame data $S_4$. The signal processing of the image processing circuit 306 is not particularly limited, and a known technique may be used such as γ (gamma) correction, frame rate control (FRC) processing, and RGB mapping. The output interface 308 outputs the output video data $S_2$ processed by the image processing circuit 306 to the source driver 106. The image processing circuit 306 also generates the control/synchronous signal $S_3$ that is to be supplied to the gate driver 104 and the source driver 106.

The abnormality detector 340 and the memory 342 are provided in relation to a function of detecting an abnormal state, especially the undisplayable state.

The memory 342 stores reference character data $S_{REF}$ describing predetermined characters that can be contained in the input video data $S_1$. The memory 342 may be a read-only memory (ROM) or a rewritable non-volatile memory such as a flash memory. Alternatively, the memory 342 may be a volatile memory as described in relation to an embodiment in FIG. 13.

The abnormality detector 340 determines whether or not an abnormality (or the undisplayable state) exists based on the input video data $S_1$ and the reference character data $S_{REF}$ when a predetermined character should be contained in a frame represented by the input video data $S_1$. Specifically, the abnormality detector 340 determines whether or not a predetermined character represented by the reference character data $S_{REF}$ is correctly contained in the input video data $S_1$. The abnormality detector 340 determines that the state is normal in a case in which the predetermined character is contained and that the state is abnormal in a case in which the predetermined character is not contained.

The processor 114 is a central processing unit (CPU) or a microcomputer comprehensively controlling the image display system 100. Although FIG. 10 illustrates a configuration in which the processor 114 is provided separately from the graphic controller 110, the function of the processor 114 may be incorporated into the graphic controller 110.

The control input interface 310 is provided separately from the video input interface 302, and the timing controller 400 is configured to enable communication with the processor 114 and can receive various control signals $S_{11}$ from the processor 114. As the control input interface 310, a register-access-type interface can be used. Favorable examples thereof include, but are not limited to, a serial peripheral interface (SPI) and an inter-integrated circuit ($I^2C$) interface.

When an abnormality is detected by the abnormality detector 340, the timing controller 400 may interrupt the processor 114. This enables notification of generation of the abnormality (generation of the undisplayable state) to be given to the processor 114. The way to interrupt the processor 114 is not particularly limited, and an interrupt request (IRQ) may be used, for example.

The configuration of the timing controller 400 has been described above. Next, an operation thereof will be described.

Figure 11:
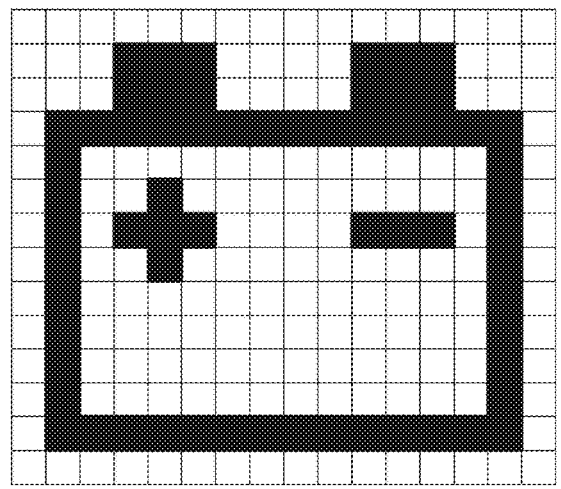
FIG. 11 illustrates an example of a predetermined character.

FIG. 11 illustrates an example of the predetermined character. The example of the predetermined character is, but is not limited to, an icon representing the battery. The memory 342 has stored therein the reference character data $S_{REF}$ representing such a predetermined character.

Figure 12A:
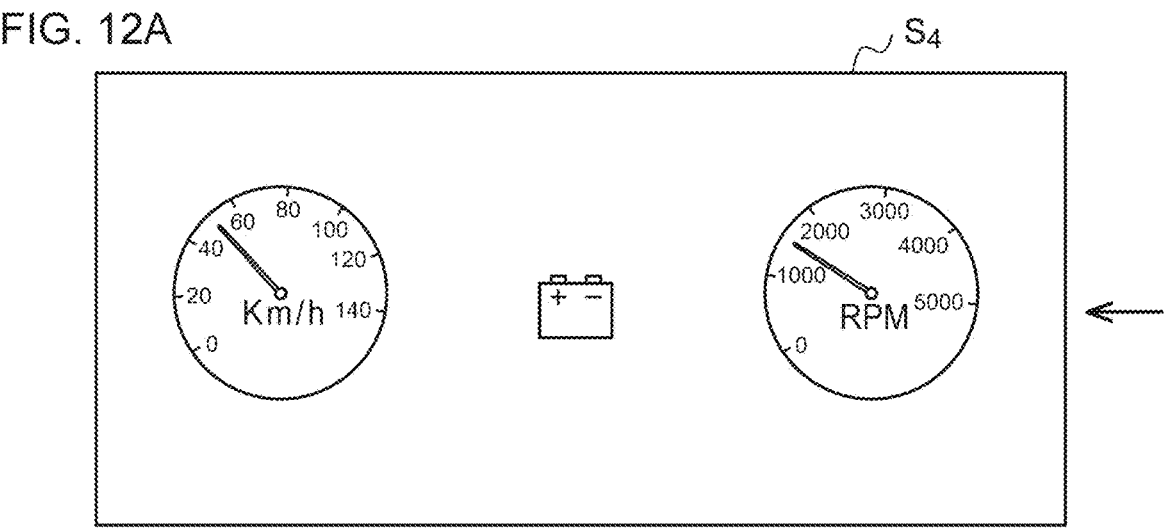
FIG. 12A and FIG. 12B illustrate abnormality detection by means of the timing controller.
Figure 12B:
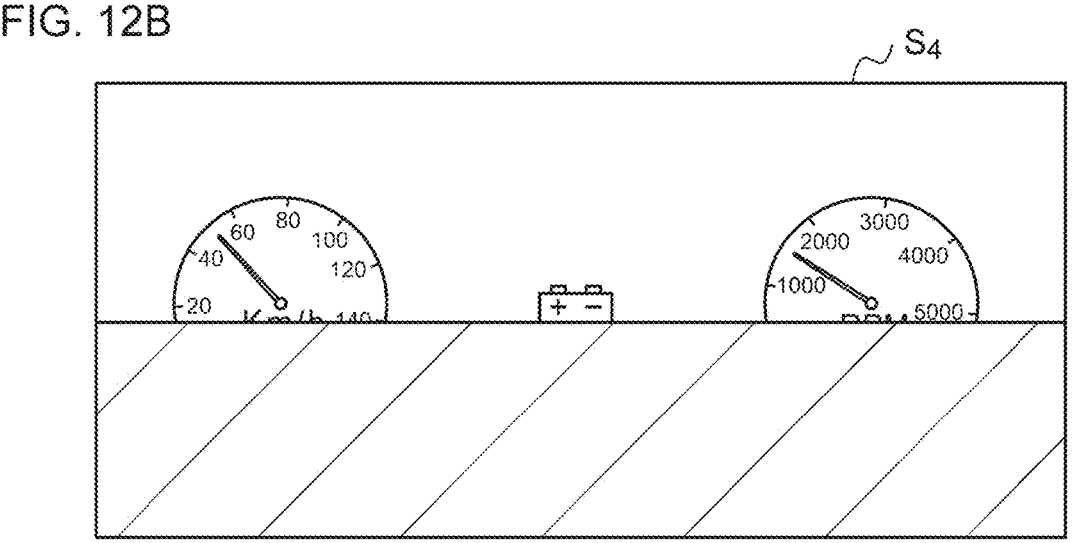

FIG. 12A and FIG. 12B illustrate abnormality detection by means of the timing controller 400. Each of FIG. 12A and FIG. 12B illustrates the frame data $S_4$ based on the input video data $S_1$ received by the video input interface 302. Here, to facilitate understanding, predetermined characters are contained at predetermined positions in all frames.

FIG. 12A illustrates frame data $S_{4a}$ in a case in which the video input interface 302 has received the input video data $S_1$ normally. The frame data $S_{4a}$ can contain various characters such as a speed meter and a tachometer. Since the frame data $S_{4a}$ in FIG. 12A contains the predetermined character in FIG. 11 correctly at a predetermined position, the abnormality detector 340 determines that the state is normal.

FIG. 12B illustrates frame data $S_{4b}$ in a case in which the video input interface 302 has not received the input video data $S_1$ correctly. In this example, information about the lower half of the frame data $S_{46}$ is lost due to a communication error, and the frame data $S_{4b}$ does not contain the lower half of the predetermined character in FIG. 11 correctly. Accordingly, the abnormality detector 340 determines that the state is abnormal.

In this manner, according to the timing controller 400 in FIG. 10, whether or not the input video data $S_1$ is received correctly can be determined, and an abnormal state can be detected.

Additional functions and characteristics of the timing controller 400 will be described below.

Preferably, the control signal $S_{11}$ that the control input interface 310 receives from the processor 114 may contain information $S_{11A}$ indicating whether or not a current frame is targeted for determination by the abnormality detector 340. Accordingly, in a case in which the predetermined character is contained in all frames, the frequency of abnormality determination (for example, once per sixty frames and once per second) can be controlled.

By using this information $S_{11A}$, a character(s) to be displayed only when a predetermined condition is satisfied can be the predetermined character. For example, each of various warning lamps to be displayed on the cluster panel corresponds to such a character.

The display position of the predetermined character can be variable. In this case, the control signal $S_{11}$ that the control input interface 310 receives from the processor 114 may contain positional information $S_{11B}$ indicating a display position of the predetermined character. Accordingly, the abnormality detector 340 may determine if the predetermined character is correctly displayed at a position indicated by the positional information $S_{11B}$ of the frame data $S_4$.

The predetermined character may be arranged in a fixed manner at a predetermined position at the end portion on the display panel that cannot be seen by the user. Accordingly, all frames can be targeted for determination by the abnormality detector 340.

The number of the predetermined characters is not limited to one but may be plural. In this case, the reference character data $S_{REF}$ may be prepared for each predetermined character.

The configuration of the present invention is comprehended as the block diagram or the circuit diagram in FIG. 10, is applied to various devices and circuits led from the above description, and is not limited to a specific configuration. Hereinbelow, more specific configuration examples and modification examples will be described to facilitate understanding of the nature of the invention and the circuit operation and clarify these, not to narrow the scope of the present invention.

Figure 13:
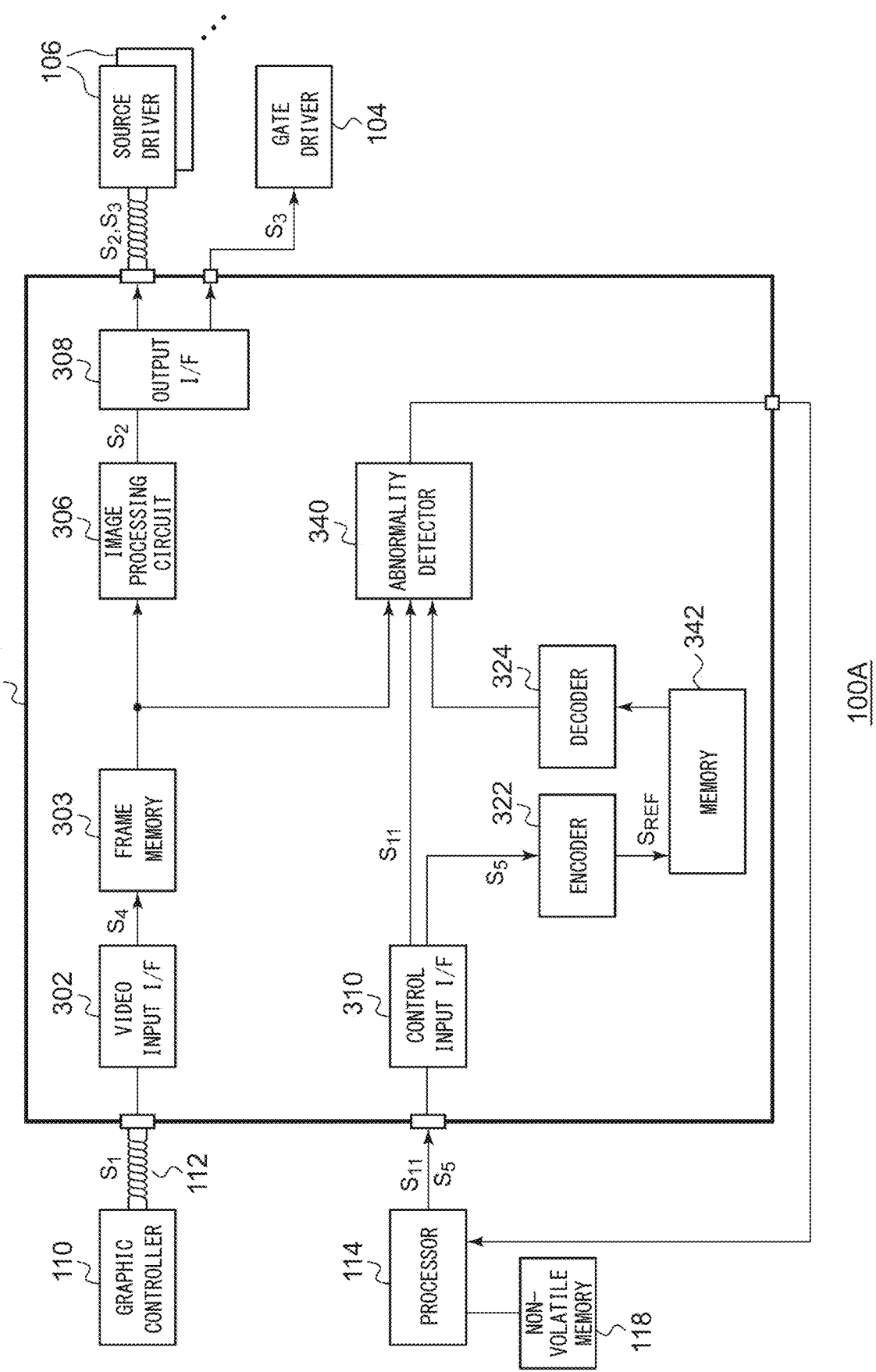
FIG. 13 is a block diagram of an image display system including a timing controller according to an embodiment.

FIG. 13 is a block diagram of an image display system 100A including a timing controller 400A according to an embodiment.

The timing controller 400A is in a setup state immediately after turning on the power. For example, the timing controller 400A has a period for setting parameters and the like of the γ correction and the RGB mapping (initializing period) at the time of the power-on as a previous stage to reception and output of the video input data to a panel. A part of the initializing period may be regarded as the setup state.

Alternatively, giving a command from an outside to the timing controller 400A may enable the setup state to be set. For example, a register associated with the setup state may be provided inside the timing controller 400A, and 1 may be written in the register from the outside (for example, the processor 114) to shift a state to the setup state. In this case, the state can be shifted to the setup state not only immediately after turning on the timing controller 400A but also at an arbitrary time.

In the present embodiment, the memory 342 may be a static random access memory (SRAM). The control input interface 310 can receive the character data $S_5$ representing the predetermined character from the processor 114 in the setup state. The character data $S_5$ is stored in the non-volatile memory 118 and is transmitted via the processor 114 to the control input interface 310. The character data $S_5$ may be monochrome or colored bitmap data without limitation. Also, the representation form of the character data $S_5$ is an arbitrary form such as icons, graphics, and characters. There may be the plurality of pieces of the character data $S_5$.

The timing controller 400A further includes the encoder 322 and the decoder 324. In the setup state, the encoder 322 encodes the character data $S_5$ received by the control input interface 310, generates the reference character data $S_{REF}$, and stores the data in the memory 342. In the normal state, the decoder 324 decodes the reference character data $S_{REF}$ read from the memory 342 and reproduces an original predetermined character.

The configuration of the timing controller 400A has been described above. Next, compression of the character data $S_5$ will be described. For compression of the character data $S_5$, run-length compression can be used. The run-length compression has been described with reference to FIG. 3 to FIG. 5A to FIG. 5C.

The configuration of the timing controller 400A has been described above. Next, an operation thereof will be described.

1. Setup State

When a device or a system including the timing controller 400A is activated, the timing controller 400A is in a setup state. The processor 114 transmits the character data $S_5$ as well as the size data SIZE to the control input interface 310. The encoder 322 compresses the received character data $S_5$ and stores the compressed data $S_6$ in the memory 342 as the reference character data $S_{REF}$. In a case in which there are a plurality of pieces of character data $S_5$, the plurality of pieces of character data are compressed sequentially.

2. Normal State

The graphic controller 110 transmits the input video data $S_1$ via the signal line 112 to the video input interface 302. The timing controller 400A processes the input video data $S_1$ and controls the gate driver 104 and the source drivers 106 to display an image on the display panel. The abnormality detector 340 determines whether or not the predetermined character reproduced by the decoder 324 is correctly contained in the frame data $S_4$.

The operation of the timing controller 400A has been described above. Next, advantages thereof will be described.

Since the encoder and the decoder for the character data for the abnormality determination are incorporated in the timing controller 400A, and the character data $S_5$ is given each time the timing controller 400A is in the setup state, the abnormality determination can be performed with use of various kinds of character data.

Also, since the character data is stored in the memory 342 in a compressed form, the capacity of the memory 342 can be reduced, which leads to cost reduction. FIG. 6 illustrates the compression ratios of the same-color segments when the second data structure in FIG. 5B is employed. Here, the bit wide of the run-length word RLW is 4 bits. As the run-length value RL is higher, the higher compression ratio is obtained. In a case in which the run-length value is 1 or 2, the segment data is larger than the data volume of the original pixel data. However, in most of characters, icons, and graphics, the run-length value is 1 or 2 only in a case of anti-aliasing or the like, and the probability of occurrence thereof is extremely low. Accordingly, the compression ratio of the entire character data can sufficiently be raised.

In a case in which the memory 342 storing the reference character data $S_{REF}$ is a ROM, the cost is raised. However, in the timing controller 400A in FIG. 13, since a volatile memory such as an SRAM can be used as the memory 342, the cost can be reduced.

In a case in which, as the non-volatile memory 118 to be connected to the processor 114, not the one time ROM but the rewritable non-volatile memory 118 such as a hard disk, a solid state drive (SSD), an electrically erasable programmable read-only memory (EEPROM), and a flash memory is used, the following advantages can be obtained. That is, in a case in which the one time ROM is used as the memory 342, and in which the reference character data $S_{REF}$ is stored in the one time ROM, the predetermined character cannot be added or changed. Conversely, in a case in which the volatile memory is used as the memory 342, and in which the rewritable non-volatile memory is used as the processor 114, the character data stored in the non-volatile memory 118 can be changed or added. Accordingly, the character for the abnormality detection can easily be changed or added.

Figure 14:
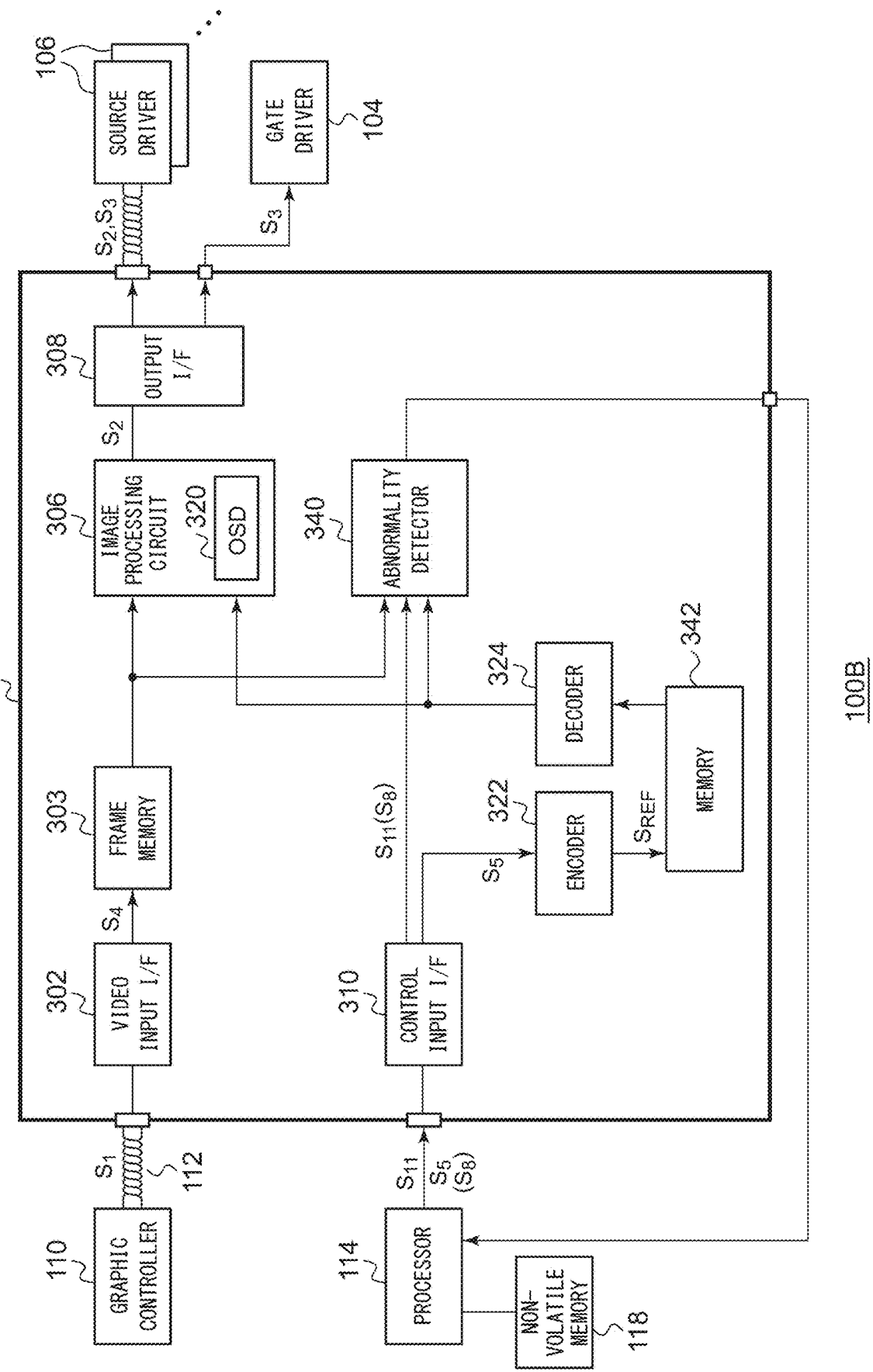
FIG. 14 is a block diagram of the image display system including a timing controller according to an embodiment.

FIG. 14 is a block diagram of the image display system 100A including a timing controller 400B according to an embodiment. The timing controller 400B includes the OSD function. The memory 342 has stored therein the character data for the OSD. Preferably, the reference character data $S_{REF}$ for the abnormality detection and the character data for the OSD are used in common. This enables the capacity of the memory 342 to be saved.

In the timing controller 400B, an OSD mode and an abnormality detection mode are switchable. The OSD mode and the abnormality detection mode may be selectable in accordance with the control signal $S_{11}$ from the processor 114.

The OSD mode and the determination mode in which determination is given by the abnormality detector may be selectable. In the determination mode, the abnormality detector 340 is activated and gives abnormality determination based on the character data reproduced by the decoder 324. The abnormality determination has been described above.

In the OSD mode, the abnormality detector 340 is deactivated, and the OSD processor 320 of the image processing circuit 306 is activated. The OSD processor 320 superimposes the character data reproduced by the decoder 324 on the frame data $S_4$ to generate the output video data $S_2$.

In a case in which a character is to be displayed on the display panel with use of the OSD function, the processor 114 sets the timing controller 400B to the OSD mode by means of the control signal $S_{11}$.

The processor 114 transmits the instruction signal $S_8$ separately from the input video data $S_1$. The instruction signal Sg contains the ID information designating one of the plurality of pieces of character data $S_5$ transmitted to the timing controller 400B in the setup state and the positional information POS designating a display position.

The decoder 324 refers to the address information $S_7$ corresponding to the ID information and accesses the corresponding compressed data $S_6$. The decoder 324 then decodes the compressed data $S_6$ based on the size data SIZE to extract the character data $S_9$ in a bitmap format. The OSD processor 320 displays the character data $S_9$ at a position designated by the positional information POS. FIG. 15 illustrates the display panel 102 on which two pieces of character data $S_{91}$ and $S_{92}$ are displayed.

According to the timing controller 400B, both the OSD function and the abnormality detection function can be provided. By using the character data for the OSD and the character data for the abnormality detection in common, the capacity of the memory 342 can be reduced.

According to the timing controller 400B, while the OSD function can be provided on one platform, the abnormality detection function can be provided on another platform.

Alternatively, in one platform, freedom to appropriately select the OSD function or the abnormality detection function can be provided. For example, the abnormality detection function may be active by default, and in a case in which an abnormality is detected by the abnormality detector 340, the OSD function may be used. When an abnormality is generated in transmission of image data via the signal line 112, the processor 114 is interrupted by the timing controller 400B. The interruption triggers the processor 114 to set the timing controller 400B to the OSD mode. By appropriately generating the instruction signal $S_8$, the processor 114 can display an image on the display.

More preferably, in the OSD mode and the abnormality detection mode, the instruction signal $S_8$ for the OSD and the control signal $S_{11}$ for the abnormality detection may be used in common. In other words, the register for control of the OSD and the register for the abnormality detection may be used in common. For example, an address at which the positional information POS for the OSD is written and an address at which the positional information $S_{11B}$ of the predetermined character is written in the abnormality detection mode may be equal. Accordingly, the capacity of the register can be reduced.

Next, use of the timing controller 400 according to the second embodiment will be described. The timing controller 400 can be used in the in-vehicle display device 600 in FIG. 8A. The in-vehicle display device 600 is buried in the console 602 on the cockpit front face. The in-vehicle display device 600 receives from the vehicle processor and displays the input video data $S_1$ including the speed meter 604, the tachometer 606 indicating the number of revolutions of the engine, the fuel remaining amount 608, and, in a case of a hybrid car or an electric car, the remaining amount of a battery (FIG. 8A).

Conventionally, an indicator lamp or a warning lamp (hereinbelow referred to simply as a warning lamp) indicating a certain abnormality or a dead battery as illustrated in FIG. 8B is displayed outside the display panel with use of an independent LED. The reason for not displaying the warning lamp on the display panel is as follows. That is, the timing controller 400 and the graphic controller 110 are connected by means of a differential serial interface. During a period from start of activation of the system to establishment of a link between the timing controller 400 and the graphic controller 110 by means of the serial interface, no image data can be transmitted, and no image can thus be displayed on the display panel 102. Also, in a case in which the link is established, and in which the link is then disconnected due to a noise or the like, no image can be displayed on the display panel 102 until the link is established again. A similar problem occurs in a case in which the cable is pulled or disconnected, or in which the serial interface or the graphic controller 110 is partially failed. Such a state in which no image can be displayed as each of the above states is referred to as "an undisplayable state."

Since the warning lamp has important information that should be given to the driver, the warning lamp is required to be lit even in the undisplayable state. Under such circumstances, the warning lamp is required to be provided outside the display panel.

Conversely, with use of the timing controller 400 according to the embodiment, the warning lamp can be displayed on the display panel as the character data $S_5$ for the OSD. The reason for this is that communication by means of the differential serial interface is not required for the OSD display. Since this can dispense with the LED and the driving circuit thereof, the cost can be reduced. Also, since a standard function of the ECU such as I²C can be used, the cost can further be reduced.

Also, in a case in which the in-vehicle display device 600 is in a state in which no input video data $S_1$ can be displayed (undisplayable state), the display panel 102 will black out, which poses a problem for driving. To solve the problem, numbers, alphabets, and the like may be prepared as the character data $S_5$ for the OSD. As illustrated in FIG. 8C, in a case in which a certain abnormality occurs during driving, and in which the speed meter 604 and the tachometer 606 cannot be displayed, the car speed information 610 and the information 612 about the number of revolutions of the engine can be displayed in real time with use of the OSD function, and the safety can be improved.

Also, during a period until the input video data $S_1$ can be displayed after the car is ignited to cause the in-vehicle display device 600 to be activated, a character string such as "PLEASE WAIT . . . " and current time can be displayed with use of the OSD function.

The timing controller 400 can be used for a medical display device. The medical display device displays information required for doctors and nurses during an examination, treatment, or operation. In the medical display device, important information (such as a heart rate and blood pressure of a patient) can be displayed with use of the OSD function even in a state in which no input video data $S_1$ can be displayed.

FIG. 9 is a perspective view illustrating the electronic device 500. The electronic device 500 in FIG. 9 can be a laptop computer, a tablet terminal, a smartphone, a portable game machine, an audio player, or the like. The electronic device 500 includes the graphic controller 110, the display panel 102, the gate driver 104, and the source drivers 106 incorporated in the chassis 502. Between the timing controller 400 and the graphic controller 110, the transmission device 120 including a differential transmitter, a transmission path, and a differential receiver may be provided.

While the preferred embodiments of the present invention have been described using specific terms, such description is for illustrative purposes only, and it is to be understood that changes and variations may be made without departing from the spirit or scope of the appended claims.

What is claimed is:

1. A timing controller comprising:
    a video input interface structured to receive input video data via a differential serial interface;
    a control input interface provided separately from the video input interface, structured to communicate with an outside processor, structured to receive graphic data for On Screen Display (OSD) in a setup state of the timing controller, and structured to receive an instruction signal indicative of OSD character to be displayed from the outside processor;
    an image processing circuit structured to generate output video data to be displayed on a display panel based on the input video data;
    an abnormality detector structured to determine whether the input video data is corrupted or not; and
    an output interface to be coupled to a gate driver and a source drive in the display panel and structured to control the gate driver and the source driver based on the output video data,
    wherein the timing controller interrupts the outside processor when an abnormality is detected by the abnormality detector so as to notify the abnormality to the outside processor.

2. The timing controller according to claim 1, wherein the abnormality detector is structured to determine whether the input video data is corrupted or not based on the input video data and a reference character data includes reference character data describing a predetermined character that can be contained in the input video data.

3. The timing controller according to claim 2, further comprising a memory structured to store the reference character data.

4. The timing controller according to claim 3, wherein the memory is arranged to store the reference character date in a setup state.

5. The timing controller according to claim 3, wherein the memory is arranged to store a compressed data of the reference character date in a setup state.

6. The timing controller according to claim 5, further comprising an encoder structured to compress the reference character data to the compressed data.

7. The timing controller according to claim 6, further comprising a decoder structured to decode the compressed data to the reference character data.

8. The timing controller according to claim 6, wherein the encoder is arranged to compress the reference character data by means of run-length compression.

9. The timing controller according to claim 6, wherein the encoder is arranged to compress the reference character data using at least one piece of segment data in the reference character data which represents a same-color segment including consecutive pixels having the same color.

10. The timing controller according to claim 1, further comprising an OSD processor for an On Screen Display (OSD) mode,
wherein the OSD processor is arranged to display information in the display panel in real time.

11. The timing controller according to claim 10, wherein the OSD processor is arranged to display the information in the display panel when the abnormality detector determines if the input video data is corrupted.

12. The timing controller according to claim 10, wherein the reference character data for the abnormality detection and the character data for the OSD are used in common.

13. The timing controller according to claim 12, wherein the OSD processor is arranged to display a character during a period until the input video data can be displayed after the timing controller is ignited to cause the display panel to be activated.

14. The timing controller according to claim 10, wherein the OSD processor display the information to be transparent or translucent by means of alpha blending.

15. The timing controller according to claim 1, wherein the abnormality detector is controlled by a frequency of abnormality determination.

16. The timing controller according to claim 1, wherein the control input interface is a serial peripheral interface (SPI) or an inter-integrated circuit (I2C) interface.

17. The timing controller according to claim 10, wherein the OSD mode and a determination mode in which determination is given by the abnormality detector are selectable.

18. The timing controller according to claim 3, wherein the memory is a non-volatile memory.

* * * * *